United States Patent
Costa-Roberts et al.

(10) Patent No.: US 10,346,270 B2
(45) Date of Patent: Jul. 9, 2019

(54) HIGH-AVAILABILITY NETWORK CONTROLLER

(71) Applicant: Arista Networks, Inc., Santa Clara, CA (US)

(72) Inventors: Justin Costa-Roberts, Santa Clara, CA (US); Karthik Subraveti, Santa Clara, CA (US); Thejesh Panchappa, Santa Clara, CA (US); Gagandeep Arneja, Santa Clara, CA (US); Andre Pech, Santa Clara, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 0 days.

(21) Appl. No.: 15/164,589

(22) Filed: May 25, 2016

(65) Prior Publication Data

US 2017/0344444 A1 Nov. 30, 2017

(51) Int. Cl.
*G06F 11/00* (2006.01)
*G06F 11/20* (2006.01)
*H04L 12/24* (2006.01)

(52) U.S. Cl.
CPC ........ *G06F 11/2007* (2013.01); *H04L 41/046* (2013.01); *H04L 41/0654* (2013.01); *H04L 41/0668* (2013.01); *G06F 2201/85* (2013.01)

(58) Field of Classification Search
CPC ............. G06F 11/2007; G06F 2201/85; H04L 41/0668
See application file for complete search history.

(56) References Cited

U.S. PATENT DOCUMENTS

| | | | | |
|---|---|---|---|---|
| 4,710,917 A | * | 12/1987 | Tompkins | H04Q 11/04 348/14.08 |
| 7,190,686 B1 | * | 3/2007 | Beals | H04B 7/2687 370/337 |
| 7,483,370 B1 | * | 1/2009 | Dayal | G06F 11/2038 370/219 |

(Continued)

FOREIGN PATENT DOCUMENTS

JP 2007-018026 1/2007

OTHER PUBLICATIONS

International Search Report and Written Opinion of the International Searching Authority, PCT/US2017/034573, dated Aug. 24, 2017, 7 pages.

*Primary Examiner* — Marc Duncan
*Assistant Examiner* — Jonathan D Gibson
(74) *Attorney, Agent, or Firm* — Womble Bond Dickinson (US) LLP (57) ABSTRACT

A method for high-availability operation is provided. The method includes communicating state information from each of a plurality of network elements to at least a first master network controller. The method includes communicating transformed state information from the first master network controller to the plurality of network elements and to each of a plurality of follower network controllers. The method includes continuing the high-availability operation with a new master network controller selected from among the plurality of follower network controllers as a failover, using the transformed state information in the new master network controller and in the plurality of network elements, responsive to a failure of the first master network controller. A network controller system is also provided.

20 Claims, 4 Drawing Sheets

(56) References Cited

U.S. PATENT DOCUMENTS

| | | |
|---|---|---|
| 8,296,527 B2 | 10/2012 | Xu et al. |
| 8,359,112 B2 | 1/2013 | Kephart et al. |
| 8,582,422 B2 * | 11/2013 | Mongeau ............ H04L 41/0668 370/216 |
| 8,676,760 B2 | 3/2014 | Shen et al. |
| 9,104,643 B2 * | 8/2015 | DeCusatis ........... G06F 11/2005 |
| 9,432,252 B2 * | 8/2016 | Koponen ............ H04L 41/0695 |
| 2006/0126501 A1 * | 6/2006 | Ramaswamy ...... G06F 11/2097 370/221 |
| 2008/0022148 A1 * | 1/2008 | Barnea ................. G06F 9/4411 714/5.1 |
| 2008/0126846 A1 * | 5/2008 | Vivian ................ G06F 11/1482 714/6.12 |
| 2011/0078490 A1 * | 3/2011 | He ...................... H04L 41/0668 714/4.11 |
| 2011/0116362 A1 * | 5/2011 | Singatwaria .............. H04J 3/14 370/216 |
| 2012/0257491 A1 * | 10/2012 | Mongeau ............ H04L 41/0668 370/216 |
| 2012/0260120 A1 * | 10/2012 | Mongeau ................ H04L 69/40 714/2 |
| 2015/0009804 A1 * | 1/2015 | Koponen ............ H04L 41/0695 370/219 |
| 2015/0010012 A1 * | 1/2015 | Koponen ............ H04L 41/0873 370/411 |
| 2015/0339200 A1 * | 11/2015 | Madduri ............. G06F 11/2028 714/4.11 |

* cited by examiner

HIGH-AVAILABILITY NETWORK CONTROLLER

BACKGROUND

Network users expect high reliability for networks. Network controllers executing various applications communicate with network elements such as switches, routers, hubs, bridges, gateways and servers to set up virtual or overlay networks with appropriate routing tables, MAC (media access control) addresses, etc. In some systems, when a network controller fails, the network elements are migrated to a new network controller so that the network(s) can continue running. But, this may involve resetting a new network controller, starting with default states and setting up new states for the network elements, and attendant delays and disruption to network service. Downtime for the new network controller is problematic. It is within this context that the embodiments arise.

SUMMARY

In some embodiments, a method, performed by a plurality of network controllers, for high-availability operation is provided. The method includes communicating state information from each of a plurality of network elements to at least a first master network controller. The method includes communicating transformed state information from the first master network controller to the plurality of network elements and to each of a plurality of follower network controllers. The method includes continuing the high-availability operation with a new master network controller selected from among the plurality of follower network controllers as a failover, using the transformed state information in the new master network controller and in the plurality of network elements, responsive to a failure of the first master network controller.

In some embodiments, a network controller system, for high-availability operation is provided. The system includes a plurality of network controllers configured to select a first master network controller and a plurality of follower network controllers. The first master network controller is configured to receive state information from each of a plurality of network elements, transform the state information, and communicate the transformed state information to the plurality of network elements and to each of the plurality of follower network controllers. The plurality of follower network controllers is configured to select a new master network controller as a failover, responsive to a failure of the first master network controller, and use the transformed state information in the new master network controller and in the plurality of network elements to continue high-availability operation.

In some embodiments, a tangible, non-transitory, computer-readable media having instructions thereupon which, when executed by one or more processors in a network controller system, cause the one or more processors to perform a method. The method includes receiving state information from each of a plurality of network elements into at least a first master network controller that is one of a plurality of network controllers in the network controller system. The method includes communicating transformed state information from the first master network controller to a plurality of follower network controllers that are among the plurality of network controllers. The method includes failing over to a new master network controller selected from among the plurality of follower network controllers in response to a failure of the first master network controller, with high-availability operation continuing using the transformed state information in the new master network controller and in the plurality of network elements.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A high-availability network controller supports network-wide services. For high reliability operation, a cluster or group of network controllers elects one leader amongst themselves. The elected leader, called a master network controller, is responsible for supporting network-wide services. The network controllers that are not the elected leader are called followers, or follower network controllers. The follower network controllers continually monitor the elected master network controller. If the master network controller crashes or becomes unreachable, the follower network controllers re-elect a new master amongst themselves. The newly elected master network controller does a graceful migration of the network elements being controlled by the high-availability network controller, to the new master network controller, in such a manner as to not cause any service disruption at the network elements. To speed up the migration of network elements from one controller to another, state read by the high-availability network controller (i.e., the group of network controllers) is read at all controllers in the cluster. However, state read by the network elements from the high-availability network controller is read only from the current master network controller.

Figure 1:
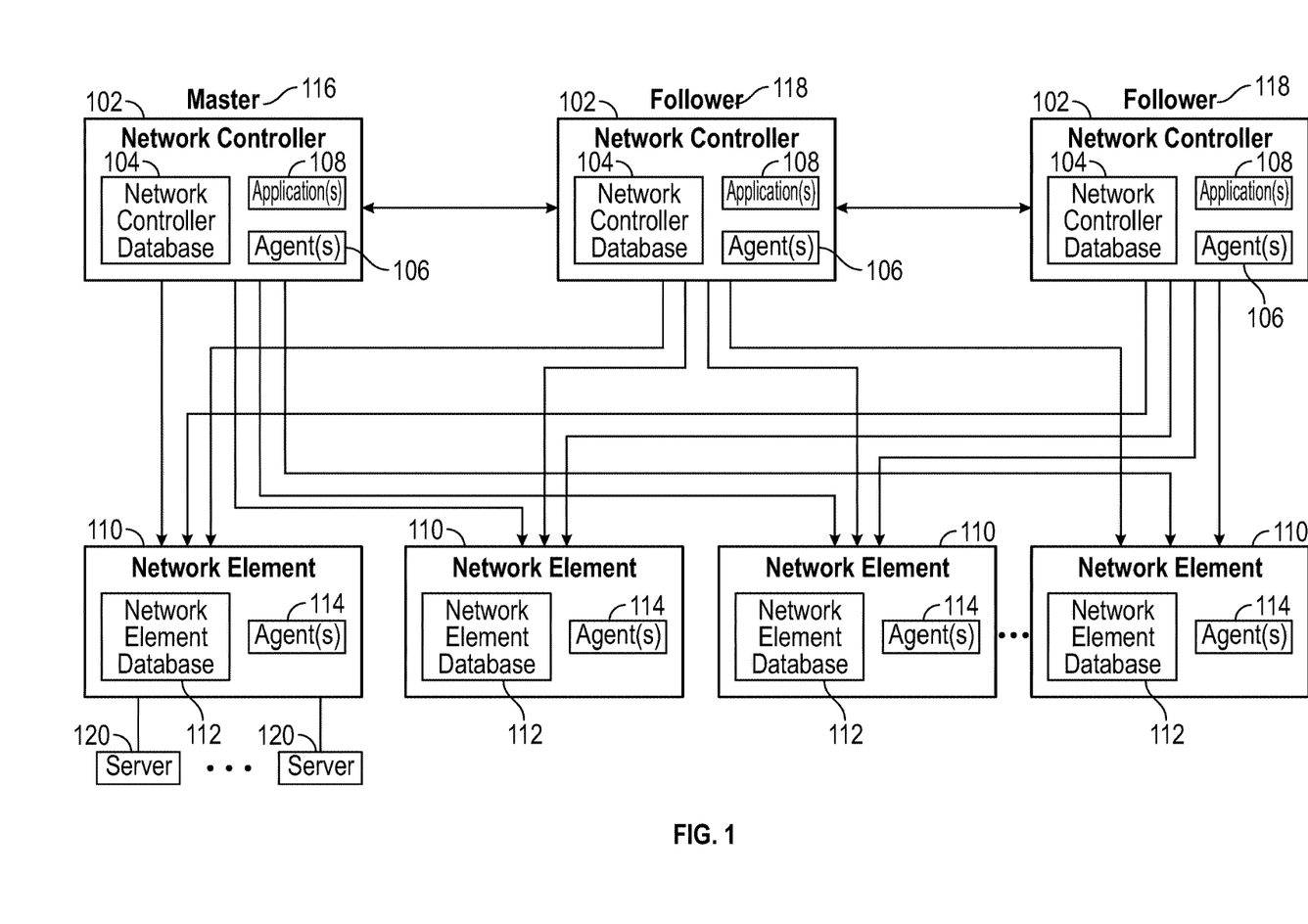
FIG. 1 is a system diagram showing network controllers, one as a master network controller, the others as follower network controllers.

FIG. 1 is a system diagram showing network controllers 102, one as a master 116 network controller, the others as follower 118 network controllers. Together, the network controllers 102 form a high-availability network controller. The high-availability network controller can be implemented with a single physical processor, using multithreading (e.g., one or more threads per network controller 102), or multiple physical processors, e.g., one or more per network controller 102, or virtualized using physical computing resources and virtual machines, in various embodiments. The network controllers 102 communicate with each other, and with network elements 110 such as switches, routers, hubs, bridges, gateways and servers, etc., which can be physical components or virtualized devices backed by physical components, or combinations thereof. Each network element 110 is shown as having a network element database 112, in which state information resides, and an agent 114 that can be used for communication with network controllers 102. A network element 110 could have more than one agent 114, and these agents 114 could be used for further communications with network elements 110, or with network controllers 102, or other tasks in the system. Each network element 110 could have one or more servers 120 could be coupled to it, or not, depending on the function(s) of that network element 110. The collective state information, across the network elements 110, determines the characteristics and operation of the network. Each network controller 102 is shown as having a network controller database 104, in which state information resides, one or more agents 106 that can be used for communication with network elements 110 and other network controllers 102, or other system tasks, and one or more applications 108 that execute on the network controller 102. Typically, these applications 108 are network-related, and are used for setting up, configuring, and managing the network formed (at least in part) by the network elements 110. For example, applications 108 could be from or conform to OpenStack, NSX™, VMware™, or other vendors, software families or standards, and relate to software defined networks (SDN), virtual networks, software defined data centers, or other aspects of networks. The network controllers have elected one of the network controllers 102 as the master 116 or master network controller, and the others are followers 118 or follower network controllers. Generally, the election has a winner if there are an odd number of network controllers 102 with which to start, although a tiebreaker algorithm could be applied if there are an even number of network controllers 102.

Figure 2:
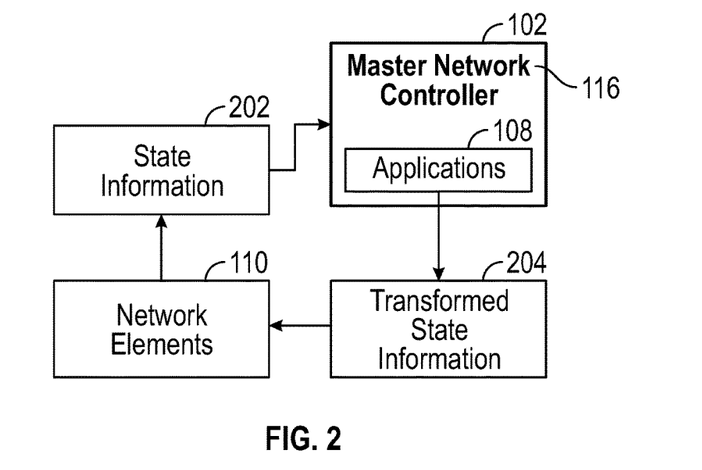
FIG. 2 depicts the master network controller of FIG. 1 transforming state information from network elements.

FIG. 2 depicts the master 116 network controller 102 of FIG. 1 transforming state information 202 from network elements 110. One mechanism for communicating the state information 202 from network elements 110 to the master 116 network controller 102 is have the agent 106 of the master 116 network controller 102 communicate with the agent 114 of a network element 110, and request a copy of some or all of the contents of the network element database 112 on that network element 110 be sent to the master 116 network controller 102. The master 116 network controller 102 then writes the state information 202 into the network controller database 104 on that network controller 102. Receiving and writing the contents of the network element database 112 into the network controller database 104 could be done by the agent(s) 106 on the network controller 102. This synchronizes the network controller database 104 and the network element database 112. Similar communication can occur across all of the network elements 110. State information 202 could be communicated from each of the network elements 110 to the master 116 network controller 102, which would then send the state information 202 to the follower 118 network controllers 102. Or, each network element 110 could communicate state information 202 of that network element 110 to each of the network controllers 102.

State information 202 could include MAC (media access control) addresses, forwarding information, security information, traffic shaping information, and/or other information that contributes to the running state of the network element 110. One or more applications 108, executing on the master 116 network controller 102, transforms the state information 202, and produces the transformed state information 204. These application(s) 108 provide network-wide services for the network elements 110 in the network.

For example, one of the applications 108 could be a global MAC address service that provides relevant MAC addresses for different network elements 110. As another example, an application 108 could provide a virtual extended local area network (VXLAN) service, which provides VXLAN information for network elements 110 that participate in a particular virtual network or VXLAN overlay. Such information could include MAC address, VTEP (virtual tunneling endpoint) information, etc.

As a further, related example, the network controller database 104 could store MAC addresses for or gathered by each of the network elements 110, routes, topology information, Port virtual local area network (VLAN) bindings, counter, inventory of physical ports on network elements 110, or other types of network state information that is for or gathered by the network elements 110 during operation of these network elements 110.

Thus, in transforming the state information 202, the master 116 network controller 102, in cooperation with the application(s) 108, comes up with replacement(s) for some or all of the state information 202 or updates to the state information 202, and this is the transformed state information 204. The master 116 network controller 102 communicates the transformed state information 202 to the network element(s) 110, e.g. using the agents 106, 114. Also, the master 116 network controller 102 writes the transformed state information 204 into the network controller database 104 (see FIG. 1) and communicates the transformed state information 204 to the follower 118 network controllers 102. Each follower 118 network controller 102 receives the transformed state information 204 writes this to the network controller database 104 on that follower 118 network controller 102. In some embodiments, the master 116 network controller 102 communicates the transformed state information 204 to each of the follower 118 network controllers 102. In other embodiments, each of the follower 118 network controllers 102 obtains the transformed state information 204 from the network elements 110.

In one embodiment, the master 116 doesn't send transformed state information 204 to the followers 118. What the master 116 sends, instead, is a list of locations in the network element database 112 of the network elements 110 that the followers 118 should read, or a list of queries to be performed on the network element database 112, to obtain the state information 202 that the applications 108 will need if the master 116 fails and there is a switchover. In this case, the applications 108 will start running on the new master 116 and will use the state information 202 to produce the transformed state information 204. But the transformed state 204 is never transferred between the network controllers 102, in this embodiment. The reason for this is that doing bulk state transfer between the network controllers would add unnecessarily to the master 116 burden. The more work that is offloaded to the followers, which are not yet doing useful work, the better is the efficiency of the master 116. Another reason for this is to avoid having partial state updates in the event the master 116 fails in the middle of a state transfer. Such failure could be addressed by having transactional guarantees for state transfer from master 116 to followers 118, in further embodiments.

Once the network elements 110 put the transformed state information 204 to use, the network operates in accordance with the transformed state information 204. Further updates, replacements or other production of further transformed state information 204 may take place, as iterations of the above processes. It is important that, in all such cases, the master 116 network controller 102, the follower 118 network controllers 102, and the network elements 110 maintain a coherent set of the transformed state information 204, so that these all operate in agreement with the latest (i.e., most recent) transformed state information 204.

Figure 3:
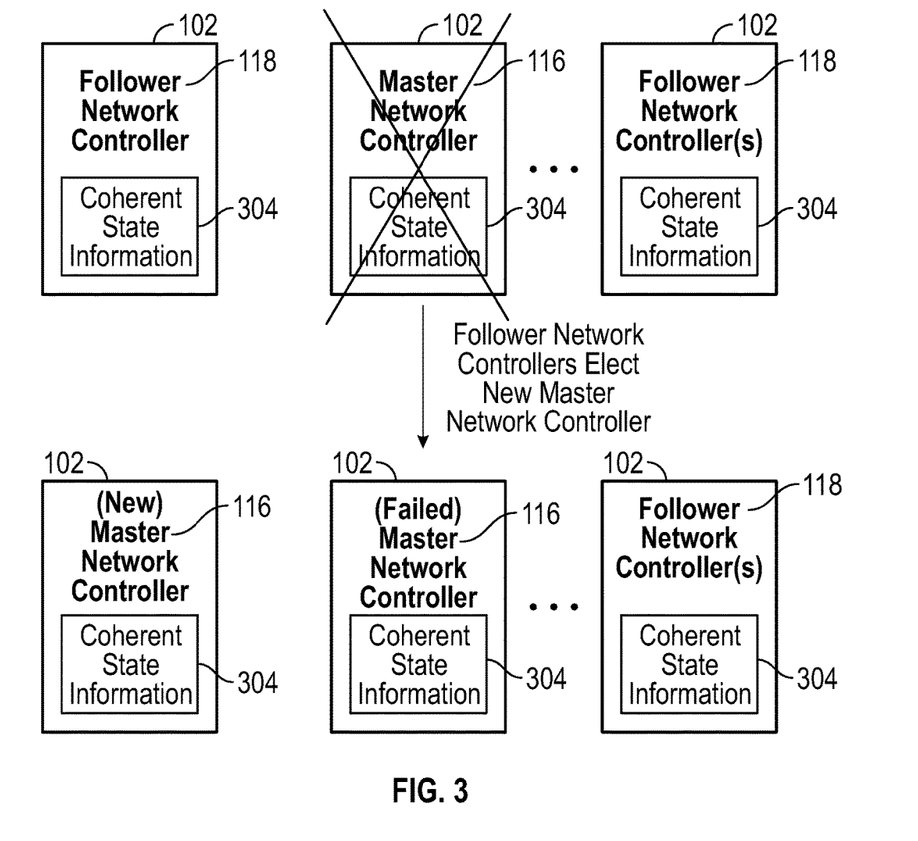
FIG. 3 depicts the master network controller of FIGS. 1 and 2 failing, and the follower network controllers electing a new master network controller, which already has the transformed state information.

FIG. 3 depicts the master 116 network controller 102 of FIGS. 1 and 2 failing, and the follower 118 network controllers 102 electing a new master 116 network controller 102, which already has the transformed state information 204. The reason why the new master 116 network controller 102 has the transformed state information 204 is because this controller 102 was formerly a follower 118 network controller 102, prior to election as a new master 116, and had access to coherent state information 304 originating from what was then the master 116 network controller 102, but is now the failed master 116 network controller 102. Or, in one embodiment, the follower 118 network controller 102 has state information 202 that the follower network controller 102 processes to produce the coherent state information 304 if, and only if, there is a switchover and that follower 118 network controller 102 becomes the master 116 network controller 102, since applications run only on the master 116. After the election, the new master 116 network controller 102 computes the coherent state information 304. This is consistent with the coherent state information 304 that the network elements 110 had prior to the failure of the earlier master 116 network controller 102 and still have. Operation of the network elements 110 under the new master 116 network controller 102 transitions smoothly at failover, without need to reset the network elements 110 and without need to clear the state information 202 or bring the state information 202 back to a default state in the network controller database 104 or any of the network element databases 112. There is no downtime for the new master 116 network controller 102, at failover. The remaining follower 118 network controllers 102 are each available to become a master 116 network controller 102 in the event that the new master 116 network controller 102 fails. If the earlier failed master 116 network controller 102 comes back up, it can obtain any updated information from the new master 116 network controller 102, and join the other network controllers 102 as a follower 118. In any of these scenarios, failover occurs with state information already in the new master 116, not starting from a reset or cleared state information.

The network elements 110 could use the Raft election protocol, or Paxos, or other consensus or voting algorithm, to select a new master 116 network controller 102, with a tiebreaker applied in case there is an even number of network controllers 102 holding an election. In some embodiments, when a master 116 network controller 102 is decommissioned, the applications 108 stop running on that controller 102. At failover, the new master 116 network controller 102 starts the applications 108 on itself, using the transformed state information 202 already on the new master 116, and there is a graceful transition of operation of the network elements 110 under the new master 116 network controller 102.

As described above, the followers 118 pre-populate states from the network elements 110. In some embodiments, commands that the master 116 network controller 102 is executing are replayed on the followers 118. The followers 118 pull in the states from the network elements 110. Each network controller 102 reads from all of the network elements 110. The followers 118 then pre-warm the states into the application(s) 108. With this and/or other techniques described above, each of the follower 118 network controllers 102 is prepared to become the new master 116 network controller 102 and execute one or more applications 108 that use the transformed state information 204, if elected. Since the states are retained on the network elements 110, switchover is fast and does not require starting over with a default or reset state. The difference between the above embodiments and other known systems is that present embodiments do not have to read state information 202 from the network elements 110 during or after the failover or switchover, since the most recent state information 202 is already in the new master 116 network controller 102.

In some embodiments, there is a relationship between graceful reboot and the warm-follower optimization described above, in which network controller followers 118 pre-read state from the switches or other network elements 110. This optimization is not required for graceful reboot, but does speed the graceful switchover process. The network controller database 104 is an in-memory database and therefore its contents may not persist across a reboot. The graceful reboot process is graceful not with respect to the network controller 102, but rather with respect to the behavior of the switches, i.e., network elements 110. More specifically, when the switch or other network element 110 notices that the master 116 network controller 102 has gone away unexpectedly, the switch or other network element 110 effectively locks down in Sysdb (e.g., network element database 112) the relevant transformed state that the switch or other network element 110 has read from the network controller 102, so the switch or other network element 110 can continue operation as usual. It appears to applications running on the switch or other network element 110 as though there have been no changes in the transformed state.

If that network controller 102 or a new one then resurfaces as the active master 116 network controller 102, its network controller database 104 (e.g., Controllerdb) may not yet be populated with the state information from the switches or other network elements 110. In order to prevent service disruption, the switch or other network element 110 must not sync its transformed state with the incomplete transformed state of the new master 116, thus the switch or other network element 110 keeps its local transformed state locked down until the controller 102 indicates that it is safe to sync. Throughout this process the switch or other network element 110 maintains the most recent set of transformed application state that is known to be valid.

In some embodiments, the network controllers 102 run different versions of applications 108, or different applications 108. An extension of the above operation is to perform a rolling upgrade of software versions in the network controllers 102. In one embodiment of a process for a rolling revision or upgrade, one follower 118 network controller 102 at a time is taken down, and upgraded, i.e., a new software version or application 108 is installed. The upgraded network controller 102 is then brought up, and remains a follower 118, until all follower 118 network controllers 102 are upgraded as needed. Then, the master 116 network controller 102, if it needs an upgrade, is deliberately brought down, and the follower network controllers 102 elect a new master 116 network controller 102 as described above. Meanwhile, the network controller 102 that has been deliberately brought down, i.e., the former master 116, is upgraded and released as a follower network controller 102. If, on the other hand, the master 116 network controller 102 does not need an upgrade, it can be left running without a forced failover. Graceful reboot, as described above, can be combined with the rolling upgrade to speed up the upgrade process as compared with cold reboots that need a complete rebuild or initial build of state information 202.

Some versions of the network controller 102 have a software version negotiating mechanism, with a version matrix. The network controller 102, e.g. using the agent 106, negotiates with one or more network elements 110, e.g., using their agents 114, to agree to what application(s) or versions of application(s) to use in managing the state information 202. Or, the network controllers 102 negotiate amongst themselves to agree on application or version. The version matrix can be consulted prior to or during the rolling upgrade discussed above, and the application(s) 108 and/or version(s) can be renegotiated after the rolling upgrade, so that the newest version or application 108 can be used. If a mismatch between network controllers 102 is detected, i.e., if one network controller 102 has applications 108 or versions that do not match those of one or more other network controllers 102, the optimization can be switched off.

Some embodiments of the high-availability network controller could be equipped with a bug alert application. This matches the configuration(s) of network elements 110 (e.g., by consulting the state information 202 stored in the network controller database 104) to information on the Web, and looks for configuration(s) that are known to have bugs or other problems. A match could trigger a rolling upgrade as described above.

Figure 4:
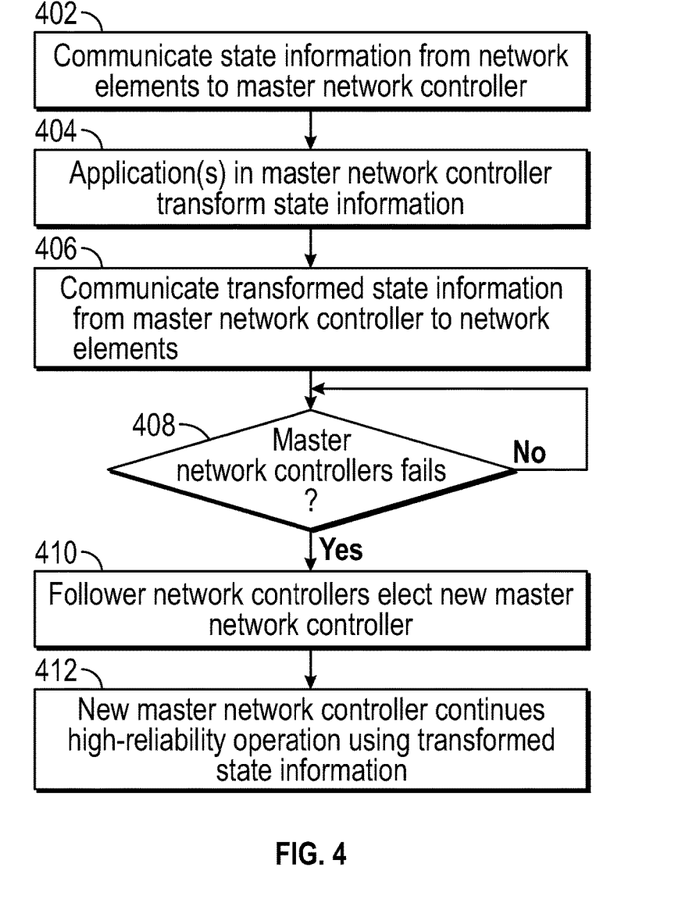
FIG. 4 is a flow diagram of a method for high-availability operation of network controllers, which can be practiced by the network controllers shown in FIGS. 1-3.

FIG. 4 is a flow diagram of a method for high-availability operation of network controllers, which can be practiced by the network controllers shown in FIGS. 1-3. Specifically, the method can be practiced by one or more processors of the network controllers or, collectively, the high-availability network controller. In an action 402, state information is communicated from network elements to the master network controller. This could be done using agents of the master network controller and network elements, which read from the network element database of each network element and write to the network controller database of the master network controller. Or, the network controller could publish some question, e.g., a CLI (command line interpreter) command, and then the network elements put the answer to that question, e.g., CLI output, in a specified place for the controller to read from. Another way to accomplish this is for the network controller to present some state information, e.g., a CLI command, to the network elements. The network elements could in turn response to that state being present by producing a transformed state, e.g., the output of the CLI command execution, that can be read by the network controller. In an action 404, one or more applications in the master network controller transform the state information. Typically, these are network-related applications that are managing the network elements 110 from the master network controller. In an action 406, the transformed state information is communicated from the master network controller to the network elements. This could be in the form of updates or revised state information or where a set of coherent state information can be accessed as described herein. It should be appreciated that the method may include communicating regarding the state information to each of a plurality of follower network controllers as described above.

In a decision action 408, it is determined whether the master network controller fails. If there is no failure, operation continues and flow branches back to loop at the decision action 408, waiting for a failure. In variations, the flow could branch elsewhere, to perform further actions, such as further transforming the state information and communicating the transformed state information to the network elements. If there is a failure, flow proceeds to the action 410.

In the action 410, the follower network controllers elect a new master network controller. In the action 412, the new master network controller continues high-reliability operation using the transformed state information. Remaining follower network controllers are available if the new master network controller fails. The failed, former master network controller may rejoin, if it recovers, as a follower network controller.

Figure 5:
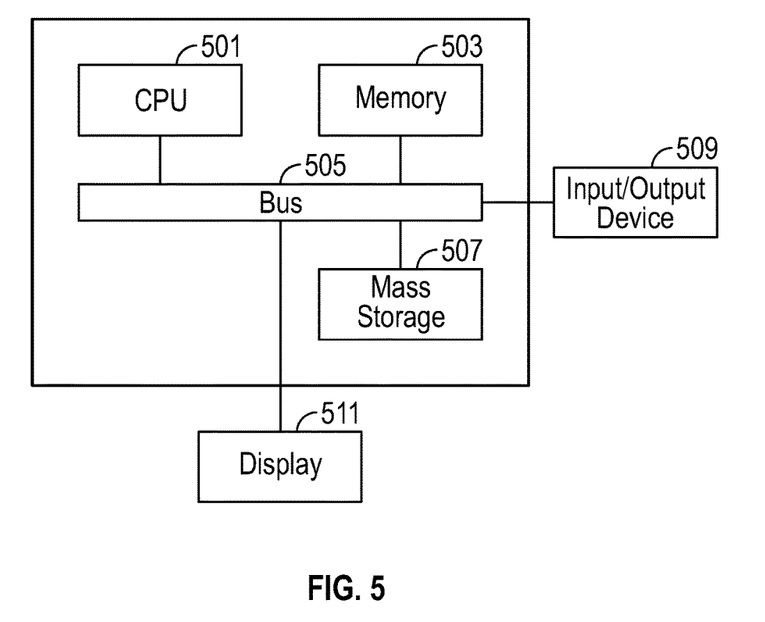
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for high-availability operation of network controllers in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, performed by a plurality of network controllers, for high-availability operation, comprising:
communicating collective state information representing characteristics and operation of a network element from each of a plurality of network elements to at least a first master network controller;
communicating regarding the collective state information to each of a plurality of follower network controllers;
communicating transformed state information representing a modification of the collective state information of some or all of the plurality of network elements from the first master network controller to the plurality of network elements;
communicating the transformed state information from the plurality of network elements to the plurality of follower network controllers; and
continuing the high-availability operation with a new master network controller selected from among the plurality of follower network controllers as a failover, using a coherent set of the transformed state information in the new master network controller and in the plurality of network elements to continue the operation of the network, responsive to a failure of the first master network controller.

2. The method of claim 1, wherein the communicating the state information is a result of an agent of the first master network controller requesting an agent of each network element communicate the state information.

3. The method of claim 1, further comprising:
electing the first master network controller from among the plurality of network controllers, with each other of the plurality of network controllers being a follower network controller.

4. The method of claim 1, further comprising:
transforming the state information from the plurality of network elements, by one or more network-related applications in the master network controller, to produce the transformed state information.

5. The method of claim 1, wherein:
the transformed state information is held in a network element database; and
the communication of transformed state information is in the form of a list of locations in the network element database of the network elements that the follower network controllers should read, or a list of queries to be performed on the network element database, to obtain the necessary state information if failure occurs.

6. The method of claim 1, wherein at the failover the network elements are not reset.

7. The method of claim 1, further comprising:
executing one or more applications on the new master network controller that use the transformed state information.

8. A network controller system, for high-availability operation, comprising:
a plurality of network controllers configured to select a first master network controller and a plurality of follower network controllers;
the first master network controller configured to receive collective state information representing characteristics and operation of a network element from each of a plurality of network elements, communicate regarding the collective state information to each of the plurality of follower network controllers, transform the collective state information, and communicate the transformed state information representation a modification of the state information of some or all of the plurality of network elements to the plurality of network elements; and
the plurality of follower network controllers configured to obtain the transformed state information from the plurality of network elements, select a new master network controller as a failover, responsive to a failure of the first master network controller, and use a coherent set of the transformed state information in the new master network controller and in the plurality of network elements to continue high-availability operation of the network.

9. The network controller system of claim 8, further comprising each of the plurality of network controllers having an agent configured to communicate with an agent of a network element so as to obtain the state information.

10. The network controller system of claim 8, wherein the first master network controller configured to transform the state information comprises:
the first master network controller configured to execute one or more network-related applications that operate on the state information to produce the transformed state information.

11. The network controller system of claim 8, further comprising:
each of the plurality of network controllers having a network controller database configured to hold the state information or the transformed state information.

12. The network controller system of claim 8, each of the plurality of follower network controllers configured to not reset at the failover, so as to continue the high-availability operation of the network without clearing the state information.

13. The network controller system of claim 8, further comprising:
each of the plurality of follower network controllers prepared to become the new master network controller and execute one or more applications that produce or use the transformed state information.

14. A tangible, non-transitory, computer-readable media having instructions thereupon which, when executed by one or more processors in a network controller system, cause the one or more processors to perform a method comprising:
receiving collective state information representing characteristics and operation of a network element from each of a plurality of network elements into at least a first master network controller that is one of a plurality of network controllers in the network controller system;
communicating regarding the collective state information from the first master network controller to a plurality of follower network controllers that are among the plurality of network controllers;

producing transformed state information representing an update of the state information for use by the plurality of network elements;

communicating the transformed state information from the plurality of network elements to the plurality of follower network controllers; and failing over to a new master network controller selected from among the plurality of follower network controllers in response to a failure of the first master network controller, with high-availability operation of the network continuing using a coherent set of the transformed state information in the new master network controller and in the plurality of network elements.

15. The computer-readable media of claim 14, wherein the method further comprises:

requesting, from an agent of the first master network controller to an agent of each of the plurality of network elements, the state information.

16. The computer-readable media of claim 14, wherein failing over to a new master network controller selected from among the plurality of follower network controllers comprises the follower network controllers electing the new master network controller.

17. The computer-readable media of claim 14, wherein the transformed state information is produced from the state information by one or more network-related applications executing on the master network controller.

18. The computer-readable media of claim 14, wherein the method further comprises:

storing the transformed state information in a network controller database in the master network controller; and storing a coherent version of the transformed state information in further network controller databases in the follower network controllers.

19. The computer-readable media of claim 14, wherein the method further comprises running the new master network controller without resetting the new master network controller at the failover.

20. The computer-readable media of claim 14, wherein the method further comprises executing one or more applications on the new master network controller, wherein the one or more applications produce or use the transformed state information.

* * * * *